United States Patent
Nagasaka

(10) Patent No.: US 7,555,003 B2
(45) Date of Patent: Jun. 30, 2009

(54) DATA TRANSFER CONTROL UNIT AND DATA TRANSFER CONTROL METHOD

(75) Inventor: Toshiro Nagasaka, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 482 days.

(21) Appl. No.: 11/528,582

(22) Filed: Sep. 28, 2006

(65) Prior Publication Data

US 2007/0089039 A1    Apr. 19, 2007

(30) Foreign Application Priority Data

Sep. 30, 2005   (JP) ............................. 2005-287393

(51) Int. Cl.
*H04L 12/54* (2006.01)
(52) U.S. Cl. .................. 370/429; 370/412; 707/100
(58) Field of Classification Search ......... 370/360–381, 370/412–429
See application file for complete search history.

(56) References Cited

U.S. PATENT DOCUMENTS 6,757,288 B1 * 6/2004 Deml et al. .............. 370/395.7
6,801,536 B1 * 10/2004 Foster et al. ................ 370/412
7,362,761 B2 * 4/2008 Suzuki et al. ............... 370/394
2005/0125426 A1 * 6/2005 Minematsu ................ 707/100

FOREIGN PATENT DOCUMENTS

JP      2003-249978      9/2003

* cited by examiner

*Primary Examiner*—Phuc H Tran
(74) *Attorney, Agent, or Firm*—Pillsbury Winthrop Shaw Pittman, LLP

(57) ABSTRACT

According to one embodiment, a data transfer control unit includes: a first status storage portion which stores first communication status information; a second status storage portion which stores second communication status information; a data storage portion which stores transmission data corresponding to a stored transmission data length information; a propriety judgment portion configured to judge whether the first communication status information is proper, based on at least one of the transmission data length information and the second communication status information; a correction portion configured to correct the first communication status information when the first communication status information is improper as a result of the judgment; and a packet transmission portion which generates and transmits a first packet containing the corrected first communication status information and the stored transmission data length information.

6 Claims, 8 Drawing Sheets

FIG. 2A

| TRANSMISSION NON-ACTIVE | TRANSMISSION DATA LENGTH = 0 | TRANSMISSION NON-ACTIVE | TRANSMISSION DATA LENGTH = 0 |
|---|---|---|---|
| HOST-SIDE RECEPTION ENABLED | | HOST-SIDE RECEPTION ENABLED | |
| HOST-SIDE ERROR ABSENCE | | HOST-SIDE ERROR ABSENCE | |

FIG. 2B

| TRANSMISSION NON-ACTIVE | TRANSMISSION DATA LENGTH = 0 | TRANSMISSION NON-ACTIVE | TRANSMISSION DATA LENGTH = 0 |
|---|---|---|---|
| GUEST-SIDE RECEPTION ENABLED | | GUEST-SIDE RECEPTION ENABLED | |
| GUEST-SIDE ERROR ABSENCE | | GUEST-SIDE ERROR ABSENCE | |

FIG. 3A

| TRANSMISSION ACTIVE HOST-SIDE RECEPTION ENABLED HOST-SIDE ERROR ABSENCE | TRANSMISSION DATA LENGTH = X | TRANSMISSION DATA |
| --- | --- | --- |
| TRANSMISSION NON-ACTIVE HOST-SIDE RECEPTION ENABLED HOST-SIDE ERROR ABSENCE | TRANSMISSION DATA LENGTH = 0 | |

FIG. 3B

| TRANSMISSION NON-ACTIVE GUEST-SIDE RECEPTION ENABLED GUEST-SIDE ERROR ABSENCE | TRANSMISSION DATA LENGTH = 0 | UNDEFINED DATA |
| --- | --- | --- |
| TRANSMISSION NON-ACTIVE GUEST-SIDE RECEPTION ENABLED GUEST-SIDE ERROR ABSENCE | TRANSMISSION DATA LENGTH = 0 | |

FIG. 4A

| TRANSMISSION NON-ACTIVE HOST-SIDE RECEPTION ENABLED HOST-SIDE ERROR ABSENCE | TRANSMISSION DATA LENGTH = 0 | UNDEFINED DATA |
| --- | --- | --- |
| TRANSMISSION NON-ACTIVE HOST-SIDE RECEPTION ENABLED HOST-SIDE ERROR ABSENCE | TRANSMISSION DATA LENGTH = 0 | |

FIG. 4B

| TRANSMISSION ACTIVE GUEST-SIDE RECEPTION ENABLED GUEST-SIDE ERROR ABSENCE | TRANSMISSION DATA LENGTH = X | TRANSMISSION DATA |
| --- | --- | --- |
| TRANSMISSION NON-ACTIVE GUEST-SIDE RECEPTION ENABLED GUEST-SIDE ERROR ABSENCE | TRANSMISSION DATA LENGTH = 0 | |

FIG. 7A

| TRANSMISSION NON-ACTIVE | TRANSMISSION DATA LENGTH = 0 | TRANSMISSION NON-ACTIVE | TRANSMISSION DATA LENGTH = X | TRANSMISSION DATA |
|---|---|---|---|---|
| HOST-SIDE RECEPTION ENABLED | | TRANSMISSION ACTIVE | | |
| HOST-SIDE ERROR ABSENCE | | HOST-SIDE RECEPTION ENABLED | | |
| | | HOST-SIDE ERROR ABSENCE | | |

FIG. 7B

| TRANSMISSION NON-ACTIVE | TRANSMISSION DATA LENGTH = 0 | TRANSMISSION NON-ACTIVE | TRANSMISSION DATA LENGTH = 0 | UNDEFINED DATA |
|---|---|---|---|---|
| GUEST-SIDE RECEPTION ENABLED | | GUEST-SIDE RECEPTION ENABLED | | |
| GUEST-SIDE ERROR ABSENCE | | GUEST-SIDE ERROR ABSENCE | | |

FIG. 8A

| TRANSMISSION NON-ACTIVE<br>HOST-SIDE RECEPTION ENABLED<br>HOST-SIDE ERROR ABSENCE | TRANSMISSION DATA LENGTH = 0 | TRANSMISSION ACTIVE → TRANSMISSION NON-ACTIVE<br>HOST-SIDE RECEPTION ENABLED<br>HOST-SIDE ERROR ABSENCE | TRANSMISSION DATA LENGTH = 0 | TRANSMISSION NON-ACTIVE<br>HOST-SIDE RECEPTION ENABLED<br>HOST-SIDE ERROR ABSENCE | TRANSMISSION DATA LENGTH = 0 |

FIG. 8B

| TRANSMISSION NON-ACTIVE<br>GUEST-SIDE RECEPTION ENABLED<br>GUEST-SIDE ERROR ABSENCE | TRANSMISSION DATA LENGTH = 0 | TRANSMISSION NON-ACTIVE<br>GUEST-SIDE RECEPTION ENABLED<br>GUEST-SIDE ERROR ABSENCE | TRANSMISSION DATA LENGTH = 0 | TRANSMISSION NON-ACTIVE<br>GUEST-SIDE RECEPTION ENABLED<br>GUEST-SIDE ERROR ABSENCE | TRANSMISSION DATA LENGTH = 0 |

FIG. 9A

| TRANSMISSION NON-ACTIVE | TRANSMISSION DATA LENGTH = 0 | TRANSMISSION ACTIVE → TRANSMISSION NON-ACTIVE | TRANSMISSION DATA LENGTH = X → TRANSMISSION DATA LENGTH = 0 | TRANSMISSION NON-ACTIVE | TRANSMISSION DATA LENGTH = 0 |
|---|---|---|---|---|---|
| HOST-SIDE RECEPTION ENABLED | | HOST-SIDE RECEPTION ENABLED | | HOST-SIDE RECEPTION ENABLED | |
| HOST-SIDE ERROR ABSENCE | | HOST-SIDE ERROR ABSENCE | | HOST-SIDE ERROR ABSENCE | |

FIG. 9B

| TRANSMISSION NON-ACTIVE | TRANSMISSION DATA LENGTH = 0 | TRANSMISSION NON-ACTIVE | TRANSMISSION DATA LENGTH = 0 | TRANSMISSION NON-ACTIVE | TRANSMISSION DATA LENGTH = 0 |
|---|---|---|---|---|---|
| GUEST-SIDE RECEPTION DISABLED | | GUEST-SIDE RECEPTION DISABLED | | GUEST-SIDE RECEPTION ENABLED | |
| GUEST-SIDE ERROR ABSENCE | | GUEST-SIDE ERROR ABSENCE | | GUEST-SIDE ERROR ABSENCE | |

DATA TRANSFER CONTROL UNIT AND DATA TRANSFER CONTROL METHOD

CROSS-REFERENCE TO RELATED APPLICATIONS

This application is based upon and claims the benefit of priority from Japanese Patent Application No. 2005-287393, filed on Sep. 30, 2005, the entire contents of which are incorporated herein by reference.

BACKGROUND

1. Field

One embodiment of the invention relates to a data transfer control unit and a data transfer control method for transferring data.

2. Description of the Related Art

A transfer unit for transferring data by packets has been used.

A transfer unit for data transfer between the transfer unit and a host is disclosed, e.g., Japanese Patent Application Publication No. 2003-2449978. That is, when the transfer unit has fallen into an abnormal operation status (no response status), the host transmits a control packet to the transfer unit to thereby resume the operation of the transfer unit.

There is however a possibility that the transfer unit will transmit a wrong packet to cause a malfunction of the system.

BRIEF DESCRIPTION OF THE SEVERAL VIES OF THE DRAWINGS

FIGS. 2A and 2B are exemplary diagrams showing examples of packets transmitted/received synchronously;

FIGS. 3A and 3B are exemplary diagrams showing examples of packets transmitted/received synchronously;

FIGS. 4A and 4B are exemplary diagrams showing examples of packets transmitted/received synchronously;

FIGS. 7A and 7B are exemplary diagrams showing corrected packets;

FIGS. 8A and 8B are exemplary diagrams showing corrected packets; and

FIGS. 9A and 9B are exemplary diagrams showing corrected packets.

DETAILED DESCRIPTION

Various embodiments according to the invention will be described hereinafter with reference to the accompanying drawings.

In general, according to one embodiment of the invention, a data transfer control unit for data transmission/reception between a first apparatus and a second apparatus, includes: a first status storage portion which stores first communication status information indicating a communication status of the first apparatus and transmission data length information indicating a data length of transmission data to be transmitted from the first apparatus to the second apparatus; a second status storage portion which stores second communication status information indicating a communication status of the second apparatus; a data storage portion which stores transmission data corresponding to the stored transmission data length information; a propriety judgment portion configured to judge whether the first communication status information is proper, based on at least one of the transmission data length information and the second communication status information; a correction portion configured to correct the first communication status information when the first communication status information is not proper as a result of the judgment; and a packet transmission portion which generates and transmits a first packet containing the corrected first communication status information and the stored transmission data length information.

Further, according to one embodiment of the invention, a data transfer control method for data transmission/reception between a first apparatus and a second apparatus, includes: judging whether first communication status information containing the communication status of the first apparatus is proper, based on at least one of transmission data length information indicating the data length of transmission data to be transmitted from the first apparatus to the second apparatus and second communication status information indicating the communication status of the second apparatus; correcting the first communication status information when the first communication status information is not proper as a result of the judgment; and generating and transmitting a first packet containing the corrected first communication status information and the transmission data length information.

As described above, according to one embodiment of the invention, there is provided a data transfer control unit and a data transfer control method in which transmission of a wrong packet is prevented to attain reduction in occurrence of a malfunction.

Figure 1:
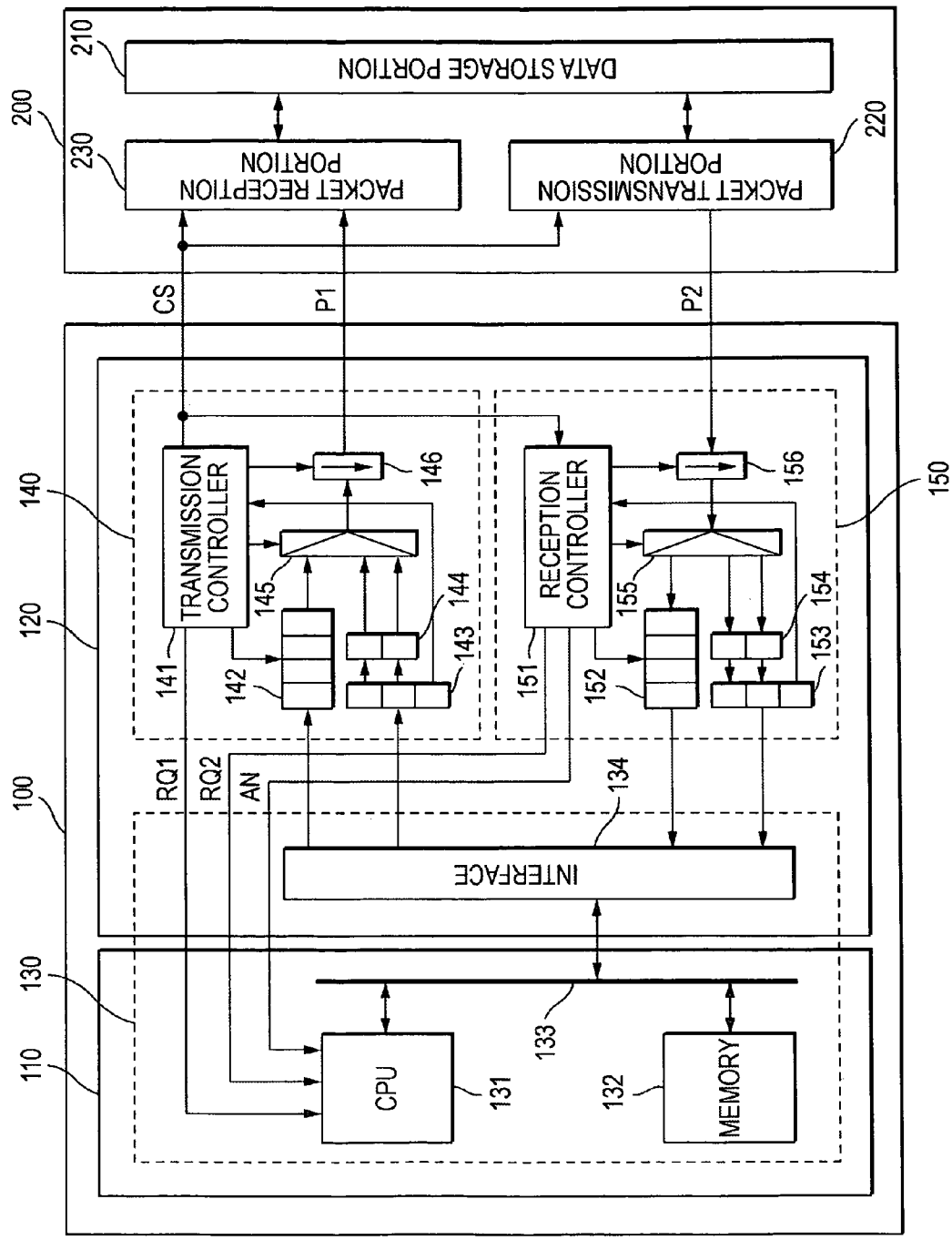
FIG. 1 is an exemplary block diagram showing a configuration of a data transmission/reception system according to an embodiment of the invention.

FIG. 1 is an exemplary block diagram showing a configuration of a data transmission/reception system according to an embodiment of the invention.

The data transmission/reception system includes a host data transmission/reception apparatus 100, and a guest data transmission/reception apparatus 200. The data transmission/reception system performs data transmission/reception by packet exchange between the host transmission/reception apparatus 100 and the guest data transmission/reception apparatus 200.

For example, the host transmission/reception apparatus 100 and the guest data transmission/reception apparatus 200 are provided as a combination of computers or as a combination of a recording medium processing apparatus and a recording medium (e.g. a memory card). For example, data transmission/reception between the host data transmission/reception apparatuses 100 and the guest data transmission/reception apparatus 200 permits data writing and reading from the host data transmission/reception apparatus 100 into the guest data transmission/reception apparatus 200 and authentication of each other.

The host data communication transmission/reception 100 includes a host main unit 110, and a serial transfer controller 120. Examples of the host main unit 110 include a computer, and/or a recording medium processing apparatus. The host main unit 110 controls the serial transfer controller 120. The serial transfer controller 120 serves as an example of a data transfer control unit for serial transfer of data between the host main unit 110 and the guest data transmission/reception apparatus 200.

The host data transmission/reception apparatus 100 can be divided into the following functional blocks: a data storage portion 130, a packet transmission portion 140 and a packet reception portion 150. In this embodiment, the data storage portion 130 is disposed to cover both the host main unit 110 and the serial transfer controller 120.

The data storage portion 130 stores and manages data to be transmitted/received to/from the guest data transmission/reception apparatus 200. The data storage portion 130 includes a CPU (Central Processing Unit) 131, a memory 132, a bus 133, and an interface 134.

The CPU 131 serves as a CPU (host CPU) provided in the host main unit 110 to control the serial transfer controller 120 and the memory 132.

The memory 132 is a storage device for storing data to be transmitted/received to/from the guest data transmission/reception apparatus 200. From the standpoint of the CPU 131, either an internal storage device or an external storage device may be used as the memory 132. In addition, any device such a semiconductor memory, a hard disk, an optical disk, etc. can be used suitably as the memory 132 as long as the device can store data.

The bus 133 is a data transfer line for exchanging data among the CPU 131, the memory 132 and the interface 134.

The interface 134 is a slave interface provided in the serial transfer controller 120. The interface 134 processes access from the CPU 131 and the memory 132.

The packet transmission portion 140 generates a packet based on data transferred from the data storage portion 130 and transmits the generated packet to the guest data transmission/reception apparatus 200. The packet transmission portion 140 includes a transmission controller 141, a transmission data buffer 142, host state buffers 143 and 144, a multiplexer 145, and a parallel-to-serial converter 146.

The transmission controller 141 controls modules relevant to transmission. Specifically, the transmission controller 141 controls the transmission data buffer 142, the multiplexer 145 and the parallel-to-serial converter 146. The transmission controller 141 can read header information of packets P1 and P2 from the host state buffer 143 and a guest state buffer 153. The transmission controller 141 outputs a transfer request signal RQ1 to the CPU 131 to control data transfer from the memory 132 to the transmission data buffer 142. The transmission controller 141 outputs a synchronous control signal CS to the guest data transmission/reception apparatus 200 to synchronize transmission and reception of packets P1 and P2 with each other.

The transmission controller 141 serves as an example of a propriety judgment portion configured to judge whether first communication status information is proper, and also serves as an example of a correction portion configured to correct the first communications status information when the first communication status information is judged to be not proper. Further, the transmission controller 141 serves as an example of re-correction portion configured to re-correct the corrected first communication information on the basis of the updated second communication status information.

The transmission data buffer 142 includes a storage cell for temporarily holding transmission data and serves as an example of a first data storage portion. The transmission data buffer 142 includes, e.g., an FIFO (Fast-In Fast-Out) buffer.

The host state buffer 143 includes a storage cell for temporarily holding the transmission status of the host-side (the host main unit 110) and transmission data length information. The transmission status of the host-side will be explained as the host transmission status hereinafter in this embodiment. The host state buffer 143 serves as an example of a first status storage portion. The transmission status indicates the communication status of the host main unit 110 which corresponds to an example of first communication status information. In addition, the transmission data length information indicates the data length of transmission data to be transmitted from the host data transmission/reception apparatus 100 to the guest data transmission/reception apparatus 200.

Similarly to the host state buffer 143, the host state buffer 144 includes a storage cell for temporarily holding the host transmission status and transmission data length information.

In this embodiment, two host state buffers 143 and 144 are disposed, and the host state buffers 143 and 144 facilitate continuous transmission of packets P1 in the following manner.

In the middle of transmission of a packet P1 from the packet transmission portion 140 to the guest data transmission/reception apparatus 200, there is a possibility that the transmission status and transmission data length information of a next packet P1 may be written into the host state buffer 143. In such a case, the transmission status and transmission data length information of the current packet P in the middle of transmission are saved from the host state buffer 143 to the host state buffer 144. As a result, the transmission status and the transmission data length information of the next packet P1 can be reserved in the host state buffer 143 without waiting for completion of transmission of the current packet P1. Accordingly, continuous transmission of the packets P1 is facilitated.

The multiplexer 145 performs time-division multiplexing on signals given from a plurality of input terminals and outputs a multiplexed signal to one output terminal.

The parallel-to-serial converter 146 converts parallel data into serial data. For example, the parallel-to-serial converter 146 includes, e.g., a shift transistor. The parallel-to-serial converter 146 generates a packet P1 from the transmission status, transmission data length information and transmission data.

The packet reception portion 150 receives a packet from the guest data transmission/reception apparatus 200 and transfers data contained in the received packet to the data storage portion 130. The packet reception portion 150 includes a reception controller 151, a reception data buffer 152, guest state buffers 153 and 154, a demultiplexer 155, and a serial-to-parallel converter 156.

The reception controller 151 controls modules relevant to reception. Specifically, the reception controller 151 controls the reception data buffer 152, the demultiplexer 155 and the serial-to-parallel converter 156. The reception controller 151 can read header information of packets P1 and P2 from the host state buffer 143 and the guest state buffer 153. The reception controller 151 outputs a transfer request signal RQ2 and a transfer completion answerback signal AN to the CPU 131 to control data transfer from the reception data buffer 152 to the memory 132. The reception controller 151 serves as an example of an update portion configured to update the second communication status information, based on a packet from the guest data transmission/reception apparatus.

The reception data buffer 152 includes a storage cell for temporarily holding reception data and serves as an example of a second data storage portion. The reception data buffer 152 includes, e.g., an FIFO (Fast-In Fast-Out) buffer.

The guest state buffer 153 includes a storage cell for temporarily holding the guest transmission status (of the guest data transmission/reception apparatus 200) and transmission data length information. The guest state buffer 153 serves as an example of a second status storage portion. The transmission status indicates the communication status of the guest data transmission/reception apparatus 200 which corresponds to an example of second communication status information. In addition, the transmission data length information indicates the data length of transmission data to be transmitted from the guest data transmission/reception apparatus 200 to the host data transmission/reception apparatus 100.

Similarly to the guest state buffer 153, the guest state buffer 154 includes a storage cell for temporarily holding the guest transmission status and transmission data length information.

In this embodiment, two guest state buffers 153 and 154 are disposed, and the guest state buffers 153 and 154 facilitate continuous reception of packets P2 in the following manner.

In the middle of transfer of reception data from the reception data buffer 152 to the memory 132, there is a possibility that reception of a next packet P2 may be started. In such a case, the transmission status and transmission data length information corresponding to the current reception data in the middle of transfer are saved from the guest state buffer 154 to the guest state buffer 153. When transfer of the current reception data to the memory 132 is then completed, data in the guest state buffer 154 is moved to the guest state buffer 153. As a result, the transmission status and transmission data length information (substantially equivalent to the reception status and reception data length information) of the next packet P2 can be stored in the guest state buffer 154, that is, can be acquired without waiting for completion of transfer of the current reception data. Accordingly, continuous reception of the packets P2 is facilitated.

The demultiplexer 155 demultiplxes a multiplexed signal given from one input terminal and outputs demultiplexed signals to a plurality of output terminals.

The serial-to-parallel converter 156 converts serial data into parallel data. For example, the serial-to-parallel converter 156 includes a shift transistor. The serial-to-parallel converter 156 decomposes a packet P2 into the transmission status, transmission data length information and transmission data.

The guest data transmission/reception apparatus 200 includes a data storage portion 210, a packet transmission portion 220, and a packet reception portion 230. Data transmission/reception based on packets is performed between the guest data transmission/reception apparatus 200 and the host data transmission/reception apparatus 100.

The data storage portion 210 stores and manages data to be transmitted/received to/from the serial transfer controller 120 (the host data transmission/reception apparatus 100).

The packet transmission portion 220 generates a packet P2 based on data transferred from the data storage portion 210 and transmits the generated packet P2 to the serial transfer controller 120. Generation and transmission of the packet P2 are controlled by a synchronous control signal CS output from the transmission controller 141.

The packet reception portion 230 receives a packet P1 from the serial transfer controller 120 and transfers data contained in the received packet P1 to the data storage portion 210.

Incidentally, although the data storage portion 210, the packet transmission portion 220 and the packet reception portion 230 can include substantially the same configurations as those of the data storage portion 130, the packet transmission portion 140 and the packet reception portion 150 of the host data transmission/reception apparatus 100, the configuration of the guest data transmission/reception apparatus is not limited thereto and any suitable configurations may be used.

A packet used for data transmission/reception between the serial transfer controller 120 and the guest data transmission/reception apparatus 200 contains a header, and a transmission data. When there is no data to be transmitted, the packet does not contain any transmission data, that is, the packet contains a header alone.

The header contains transmission status (communication status information) and transmission data length information (information about the data length of transmission data contained in the packet).

The transmission status (communication status information) is information indicating the transmission communication status. The transmission status contains transmission active information, reception enabled information, and error presence information.

The transmission active information indicates whether data transmission is active or non-active on the packet transmission side, i.e. whether it is in the middle of data transmission or not. When it is in the middle of data transmission, the transmission active information is set as "transmission active". When it is not in the middle of data transmission, the transmission active information is set as "transmission non-active."

The reception enabled information indicates whether reception of data is enabled or disabled on the packet transmission side. When reception of data is enabled, the reception enabled information is set as "reception enabled." When reception of data is disabled, the reception enabled information is set as "reception disabled."

The error presence information indicates whether communication error occurs or not on the packet transmission side. When communication error occurs, the error presence information is set as "error presence." When no communication error occurs, the error presence information is set as "error absence."

FIGS. 2 to 4 are exemplary diagrams showing examples of packets P1 and P2 transmitted/received synchronously, respectively. In each of FIGS. 2A, 3A and 4A, packets P1 are explained. In each of FIGS. 2B, 3B and 4B, packets P2 are explained.

In each of FIGS. 2 to 4, packets P1 and packets P2 (three packets P1 and three packets P2 in FIGS. 2A and 2B or two packets P1 and two packets P2 in each of FIG. 3A, 4A and 3B, 4B) are transmitted and received continuously. In each of FIGS. 2 to 4, the chain line shows synchronization between transmission timing and reception timing of headers (transmission status and transmission data length information) of the packets P1 and P2.

In this embodiment, transmission of a packet P1 from the host data transmission/reception apparatus 100 and reception of a packet P2 are performed substantially simultaneously (the time difference between transmission and reception is small). Transmission and reception of the packets P1 and P2 may be performed alternately. In this embodiment, the concept "synchronous transmission and reception of the packets P1 and P2" can includes such alternate transmission and reception of the packets P1 and P2.

In FIGS. 2A and 2B, both the host data transmission/reception apparatus 100 and the guest data transmission/reception apparatus 200 are "transmission non-active." For this reason, each of the three packets P1 (P2) has no transmission data, that is, has a header (transmission status and transmission data length information (value=0)) alone.

In FIG. 3A, the host data transmission/reception apparatus 100 changes from "transmission non-active" to "transmission active." For this reason, the second packet P1 has a header (transmission status and transmission data length information (value≠0)) and transmission data. On the other hand, in FIG. 3B, the second packet P2 has no transmission data, that is, has a header (transmission status and transmission data length information (value=0)) alone. Undefined data following the header of the second packet P2 is ignored by the host data transmission/reception apparatus 100 because the data is not transmission data.

In FIG. 4B, the guest data transmission/reception apparatus 200 changes from "transmission non-active" to "transmission active." For this reason, the second packet P2 has a header (transmission status and transmission data length information (value≠0)) and transmission data. On the other hand, in FIG. 4A, the second packet P1 does not have transmission data, that is, has a header (transmission status and transmission data length information (value=0)) alone. Undefined data following the header of the second packet P1 is ignored by the guest data transmission/reception apparatus 200 because the data is not transmission data.

(Operation of Data Transmission/Reception System)

Figure 5:
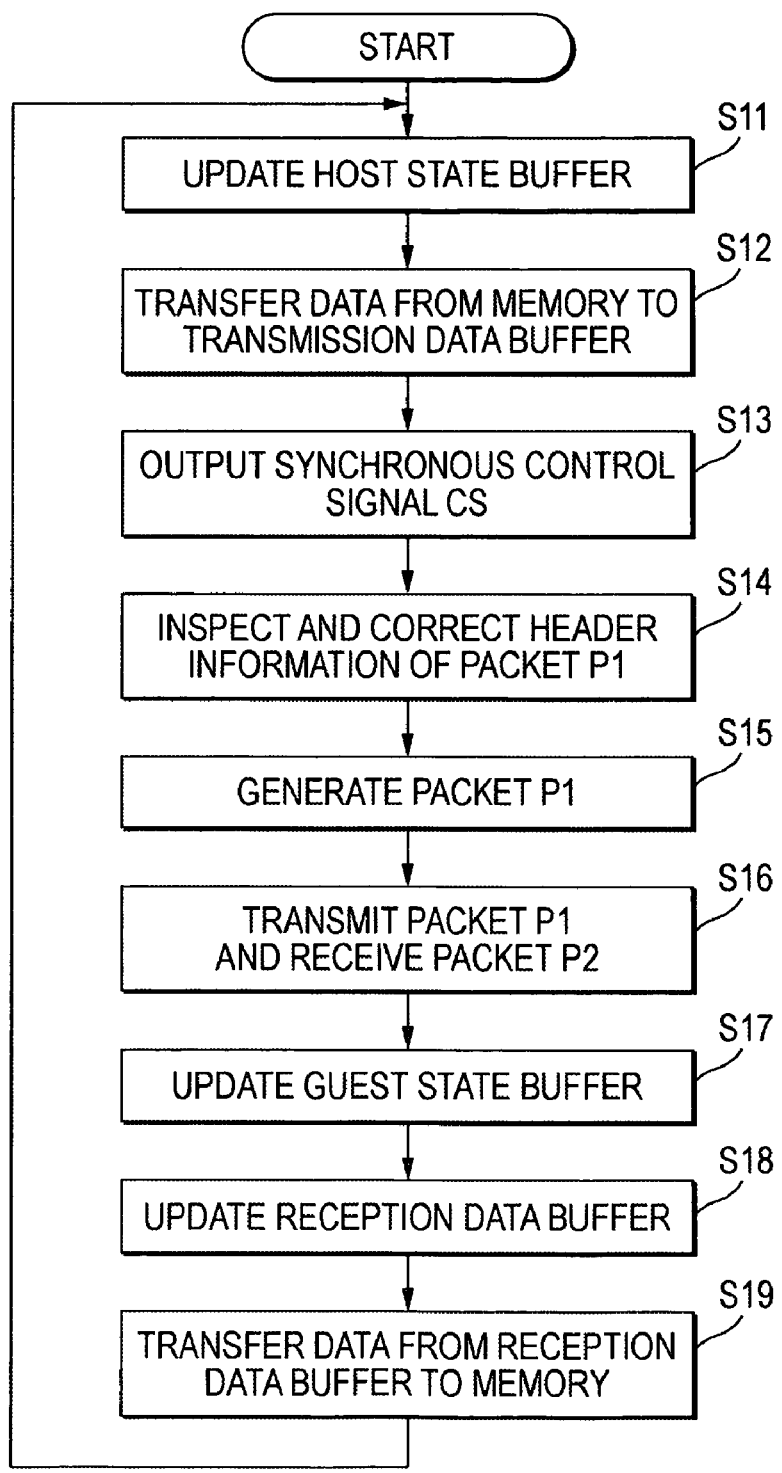
FIG. 5 is an exemplary flow chart showing an example of a procedure in an operation of a host data transmission/reception apparatus of the embodiment.

FIG. 5 is an exemplary flow chart showing an example of an procedure in an operation of the host data transmission/reception apparatus of the embodiment.

(1) Update of Host State Buffer 143 (Block S11)

The storage content of the host state buffer 143 is updated.

The host state buffer 143 is rewritten suitably by the CPU 131 through the interface 134. As a result, the transmission status (transmission active information, reception enabled information and error presence information) and transmission data length information are updated so that the host state buffer 143 reflects communication status, etc., of the host main unit 110.

(2) Data Transfer from Memory 132 to Transmission Data Buffer 142 (Block S12)

When the host side is "transmission active" and the guest side is "reception enabled" and "error absence," a transfer request signal RQ1 is output from the transmission controller 141 to the CPU 131. Accordingly, data corresponding to a transmission data of a packet P1 is transferred from the memory 132 to the transmission data buffer 142. In this case, the transmission active information in the host state buffer 143 is set as "transmission active" and the reception enabled information and the error presence information in the guest state buffer 153 are set as "reception enabled" and "error absence" respectively.

Data is transferred from the memory 132 to the transmission data buffer 142 through the interface 134 in accordance with the transfer request signal RQ1.

After the data with a predetermined data length (corresponding to the transmission data length information in the host state buffer 143) is transferred to the transmission data buffer 142, the transfer request signal RQ1 from the transmission controller 141 to the CPU 131 is stopped.

In this embodiment, when the transmission data buffer 142 is full of data before the data with the predetermined data length is transferred, the transfer request signal RQ1 from the transmission controller 141 is stopped. When an area of the transmission data buffer 142 is then made vacant, the transfer request from the transmission controller 141 to the CPU 131 is resumed. Accordingly, the serial transfer controller 120 can respond to change in data quantity of the transmission data buffer 142 due to generation and transmission of the packet P1.

(3) Output of Synchronous Control Signal CS from Transmission Controller 141 (Block S13)

A synchronous control signal CS is output periodically from the packet transmission portion 140 (the transmission controller 141) of the host data transmission/reception apparatus 100 to the guest data transmission/reception apparatus 200 (the packet transmission portion 220 and the packet reception portion 230) and the host reception controller 151. Accordingly, transmission of packets P1 and P2 from the packet transmission portions 140 and 220 with reception of packets P1 and P2 into the packet reception portions 150 and 230 (transmission and reception of packets P1 and P2) are synchronized. That is, the synchronous control signal CS output from the transmission controller 141 triggers generation, transmission and reception of packets P1 and P2. For example, after a predetermined time has lapsed since output of the synchronous control signal CS, packets P1 and P2 are transmitted respectively.

(4) Inspection and Correction of Header Information of Packet P1 to be Transmitted (Block S14)

The header information of the packet P1 to be transmitted is inspected. When there is any error in the header information of the packet P1, the header information of the packet P1 is corrected. Accordingly, transmission of an improper packet P1 is prevented, and data transmission/reception is quickened. Details of this block S14 will be described later.

(5) Generation of Packet P1 (Block S15)

The packet P1 is generated under the control of the transmission controller 141. In this embodiment, two cases about this block S15 will be explained: (5-1) generation of packet containing header alone; and (5-2) generation of packet containing header and data.

(5-1) Generation of Packet Containing Header Alone

When the transmission active information is set as "transmission non-active," the packet P1 containing no transmission data, that is, containing a header (transmission status and transmission data length information (the transmission data length with a value of 0)) alone is generated (see FIG. 2A).

This packet P1 is generated as follows.

In accordance with an instruction given from the transmission controller 141 to the multiplexer 145, the host-side transmission status (communication status information) and transmission data length information set in the host state buffer 143 are sent to the parallel-to-serial converter 146 and are converted from parallel data to serial data. The packet P1 is generated by this parallel-to-serial conversion at the parallel-to-serial converter 146.

(5-2) Generation of Packet Containing Header and Data

When the transmission active information is set as "transmission active," the packet P1 containing a header (transmission status and transmission data length information (the transmission data length with a non-zero value)) and a transmission data is generated (see FIG. 3A).

This packet P1 is generated as follows.

In accordance with an instruction given from the transmission controller 141 to the multiplexer 145, the host transmission status (communication status information) and transmission data length information set in the host state buffer 143 are sent to the parallel-to-serial converter 146 and are converted from parallel data to serial data. The header of the packet P1 is generated by the parallel-to-serial conversion at the parallel-serial converter 146. The generated header is the same as that of the packet P1 containing the header alone, except transmission data length information.

Parallel-to-serial conversion of data in the transmission data buffer 142 follows the parallel-to-serial conversion of the information in the host state buffer 143. That is, in accordance with an instruction given from the transmission controller 141 to the transmission data buffer 142, the data stored in the transmission data buffer 142 is sent to the parallel-to-serial converter 146 and subjected to parallel-to-serial conversion.

Transmission of the transmission data to the parallel-to-serial converter 146 follows transmission of the communication status information and the transmission data length information, so that a packet containing the header (transmission status and transmission data length information) and the transmission data is generated.

(6) Transmission and Reception of Packets P1 and P2 (Block S16)

The packet transmission portion 140 transmits the generated packet P1 to the packet reception portion 230. In addition, a packet P2 transmitted from the packet transmission portion 220 is received by the packet reception portion 150. The packet P2 is generated and transmitted by the packet transmission portion 220 in response to output of the synchronous control signal CS.

That is, transmission of the packet P1 from the packet transmission portion 140 and reception of the packet P2 into the packet reception portion 150 are synchronized with each other in response to output of the synchronous control signal CS.

(7) Update of Guest State Buffer 153 (Block S17)

The storage content of the guest state buffer 153 is updated in accordance with reception of the packet P2. As a result, the transmission status (transmission active information, reception enabled information and error presence information) and transmission data length information are updated so that the guest state buffer 153 reflects the communication status, etc., of the guest data transmission/reception apparatus 200.

Under the control of the reception controller 151, the packet P2 is input as serial data into the serial-to-parallel converter 156 and subjected to serial-to-parallel conversion so that the packet P2 is divided into the guest transmission status and transmission data length information. The divided transmission status and transmission data length information are input into the guest state buffer 153 via the guest state buffer 154.

(8) Update of Reception Data Buffer 152 (Block S18)

When the packet P2 contains transmission data, the transmission data are input into the reception data buffer 152.

This input process is executed when the transmission active information in the guest state buffer 153 is set as "transmission active" and the reception enabled information and the error presence information in the host state buffer 143 are set as "reception enabled" and "error absence" respectively.

Under the control of the reception controller 151, the transmission data following the transmission data length information is subjected to serial-to-parallel conversion by the serial-to-parallel converter 156 in accordance with the value of the transmission data length, so that parallel data are input to the reception data buffer 152.

(9) Data Transfer from Reception Data Buffer 152 to Memory 132 (Block S19)

A transfer request signal RQ2 is output from the reception controller 151 to the CPU 131. In accordance with the transfer request signal RQ2, data are transferred from the reception data buffer 152 to the memory 132 through the interface 134.

In this embodiment, when the reception data buffer 152 is filled with a predetermined number of data, a transfer request signal RQ2 is output from the reception controller 151 to the CPU 131. The reception controller 151 counts the quantity of transmission data to be transferred. After a quantity of transmission data corresponding to the transmission data length is transferred from the reception data buffer 152 to the memory 132, this transfer is completed. On this occasion, a transfer completion answerback signal AN indicating completion of the transfer is output from the reception controller 151 to the CPU 131. When the data transfer is completed, the routine of processing goes back to the Block S11 to repeat processing.

In this embodiment, when communication between the reception data buffer 152 and the memory 132 is busy, the transmission status of the host state buffer 143 is changed to "reception disabled." As a result, the packet P2 containing transmission data is not transmitted from the guest data transmission/reception apparatus 200. In this manner, data hard to be processed by the reception data buffer 152 can be prevented from being input into the reception data buffer 152.

(Automatic Correction of Header)

Figure 6:
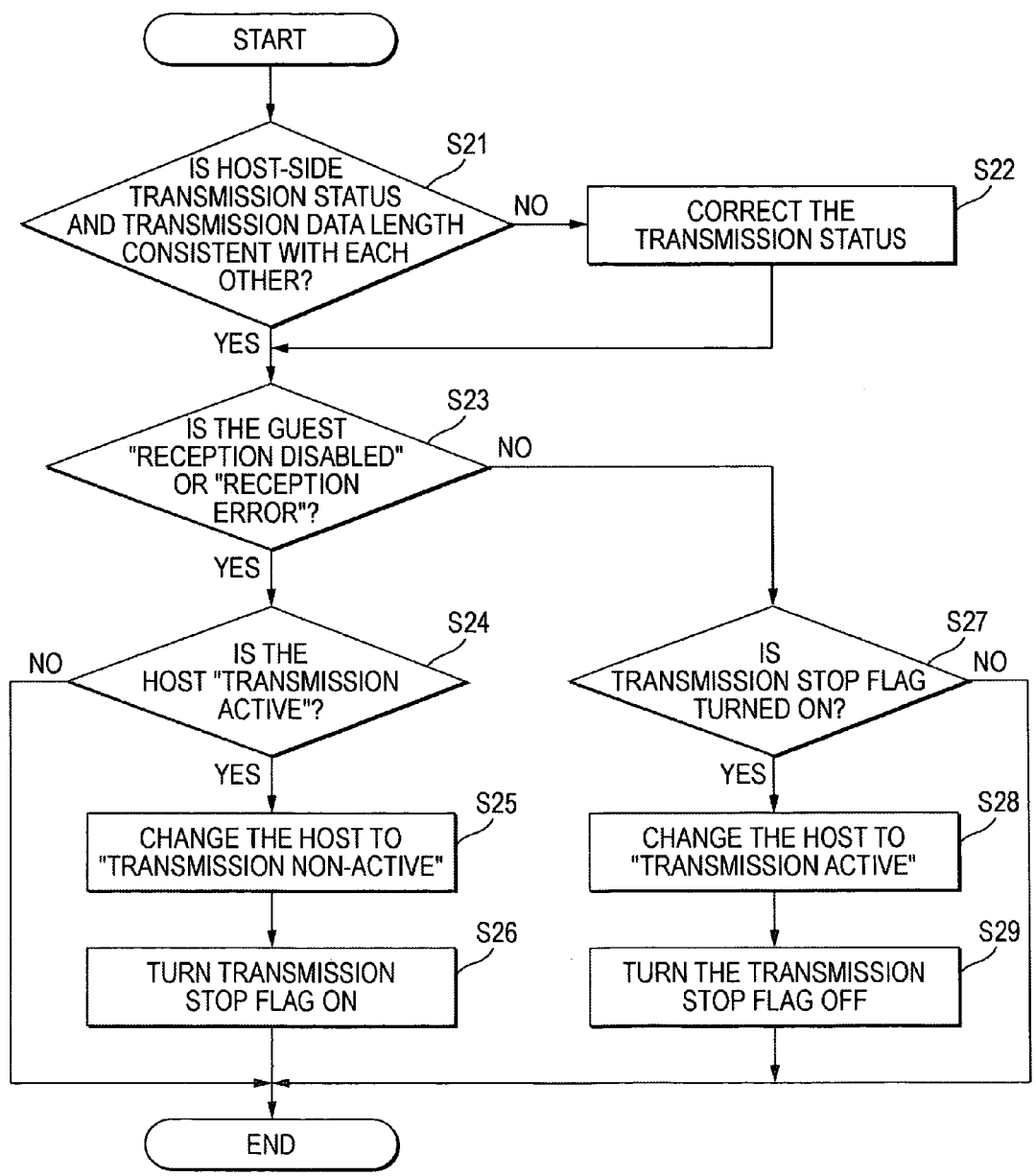
FIG. 6 is an exemplary flow chart showing details of inspection and correction of header information in the embodiment.

FIG. 6 is an exemplary flow chart showing details of inspection and correction of header information in the Block S14 in FIG. 5.

(1) Measure against Inconsistency in Heater Information of Host (Blocks S21 and S22)

A judgment is made as to whether the transmission status of the host and the transmission data length are consistent with each other or not (Block S21). When there is any inconsistency, the transmission status of the host is corrected (Block S22). When the CPU 131 makes improper setting on the host state buffer 143, the transmission controller 141 can correct the error.

Specifically, the following two cases may be conceived.

(i) The case where the transmission status is set as "transmission non-active" and the transmission data length has a non-zero value When the transmission status set in the host state buffer 143 is "transmission non-active" and the transmission data length has a non-zero value, the header information is corrected.

That is, when the transmission status is sent to the parallel-to-serial converter 146, the transmission status is corrected to "transmission active."

Then, the parallel-to-serial converter 146 outputs the corrected transmission status and the transmission data length information as serial data to thereby generate a header.

FIGS. 7A and 7B are exemplary diagrams showing corrected packets. As illustrated in FIG. 7A, header information of a packet P1 is corrected from "transmission non-active" to "transmission active."

(ii) The case where the transmission status is set as "transmission active" and the transmission data length has a zero value When the transmission status set in the host state buffer 143 is "transmission active" and the transmission data length has a zero value, the header information is corrected.

That is, when the transmission status is sent to the parallel-to-serial converter 146, the transmission status is corrected to "transmission non-active."

Then, the parallel-to-serial converter 146 outputs the corrected transmission status and transmission data length information as serial data to thereby generate a header.

FIGS. 8A and 8B are exemplary diagrams showing corrected packets. As illustrated in FIG. 8A, header information of a packet P1 is corrected from "transmission active" to "transmission non-active."

(2) Stop of Data Transmission due to Guest-Side Transmission Status (Blocks S23 to S25)

A judgment is made as to whether the guest side is "reception disabled" or "reception error" (Block S23).

When the judgment results in "Yes," a judgment is made as to whether the host side is "transmission active" or not (Block S24).

As a result, when the transmission status set in the host state buffer 143 is "transmission active" and the transmission status set in the guest state buffer 153 is "reception disabled" or "reception error," the header information is corrected (Block S25).

Specifically, when the transmission status is sent to the parallel-to-serial converter 146, the transmission status is corrected to "transmission non-active" and the transmission data length is corrected to zero. That is, when the host side intends to transmit data in the condition that the guest side is "reception disabled," the host-side transmission status is changed automatically (to "transmission non-active" and transmission data length=0) to thereby stop the transmission.

Then, the parallel-to-serial converter 146 outputs the corrected transmission status and transmission data length as serial data to thereby generate a header.

FIGS. 9A and 9B are exemplary diagrams showing corrected packets. As illustrated in FIG. 9, header information of a packet P1 is corrected from "transmission active" and "transmission data length=X (other than 0)" to "transmission non-active" and "transmission data length=0."

(3) Start of Data Transmission due to Change in Guest-Side Transmission Status (Blocks 26 to S29)

When the guest-side transmission status is "reception disabled" or "error presence" as described above, data transmission is stopped.

On this occasion, the guest-side transmission status is monitored so that data transmission can be started when the transmission status is changed to "reception enabled" and "error absence."

1) A transmission stop flag is turned ON (Block S26). The "transmission stop flag" is a flag indicating that transmission is stopped. For example, 1-bit data is used as the transmission stop flag, so that ON/OFF of the transmission stop flag can be expressed by the value (1 or 0) of the 1-bit data.

When the flag is turned ON, monitoring the guest-side transmission status is continued. Specifically, when the Block S14 in FIG. 5 is executed repetitively, the Block S23 is executed again. When the judgment in the Block S23 results in "No," it means that the guest-side transmission statue is "reception enabled" and "error absence."

2) When the judgment in the Block S23 results in "No" and the transmission stop flag is ON, the host-side transmission status is set as "transmission active" (Blocks S23, S27 and S28). As a result, data transmission from the host side is started. Incidentally, since the transmission stop state is canceled, the transmission stop flag is turned OFF (Block S29).

As described above, data is transmitted immediately in the stage where the guest-side reception is enabled.

While certain embodiment has been described, this embodiment has been presented by way of example only, and is not intended to limit the scope of the inventions. Indeed, the novel unit and method described herein may be embodied in a variety of other forms; furthermore, various omissions, substitutions and changes in the form of the unit and method described herein may be made without departing from the sprit of the inventions. The accompanying claims and their equivalents are intended to cover such forms or modifications as would fall within the scope and spirit of the inventions.

What is claimed is:

1. A data transfer control unit for data transmission/reception between a first apparatus and a second apparatus, comprising:

a first status storage portion which stores first communication status information indicating a communication status of the first apparatus and transmission data length information indicating a data length of transmission data to be transmitted from the first apparatus to the second apparatus;

a second status storage portion which stores second communication status information indicating a communication status of the second apparatus;

a data storage portion which stores transmission data corresponding to the stored transmission data length information;

a propriety judgment portion configured to judge whether the first communication status information is proper, based on at least one of the transmission data length information and the second communication status information;

a correction portion configured to correct the first communication status information when the first communication status information is not proper as a result of the judgment; and a packet transmission portion which generates and transmits a first packet containing the corrected first communication status information and the stored transmission data length information.

2. The data transfer control unit according to claim 1, wherein, when the first communication status information indicates that transmission from the first apparatus is active and the second communication status information indicates that reception to the second apparatus is disabled or in the presence of communication error, the propriety judgment portion decides that the first communication status information is not proper, and wherein the correction portion corrects the first communication status information to deactivate transmission from the first apparatus, in accordance with the result of the judgment.

3. The data transfer control unit according to claim 2, further comprising:

an update portion configured to update the second communication status information stored in the second status storage portion, based on a packet from the second apparatus; and a re-correction portion configured to re-correct the corrected first communication status information on the basis of the updated second communication status information to activate transmission from the first apparatus.

4. The data transfer control unit according to claim 1, wherein, when the first communication status information indicates that transmission from the first apparatus is active and the transmission data length information indicates that the data length of the transmission data has a zero value, the propriety judgment portion decides that the first communication status information is not proper, and wherein the correction portion corrects the first communication status information to deactivate transmission from the first apparatus, in accordance with the result of the judgment.

5. The data transfer control unit according to claim 4, wherein, when the first communication status information indicates that transmission from the first apparatus is non-active and the transmission data length information indicates that the data length of the transmission data has a non-zero value, the propriety judgment portion decides that the first communication status information is not proper, and wherein the correction portion corrects the first communication status information to activate transmission from the first apparatus, in accordance with the result of the judgment.

6. A data transfer control method for data transmission/reception between a first apparatus and a second apparatus, comprising:

judging whether first communication status information containing the communication status of the first apparatus is proper, based on at least one of transmission data length information indicating the data length of transmission data to be transmitted from the first apparatus to the second apparatus and second communication status information indicating the communication status of the second apparatus;

correcting the first communication status information when the first communication status information is not proper as a result of the judgment; and generating and transmitting a first packet containing the corrected first communication status information and the transmission data length information.

* * * * *